United States Patent [19]

Hoffman

[11] 3,793,805
[45] Feb. 26, 1974

[54] METHOD AND APPARATUS FOR REMOVING AIR FROM A LIQUID

[75] Inventor: Edward P. Hoffman, Rochester, N.Y.

[73] Assignee: Eastman Kodak Company, Rochester, N.Y.

[22] Filed: Dec. 13, 1971

[21] Appl. No.: 207,053

[52] U.S. Cl............................ 55/49, 55/52, 55/201, 55/208
[51] Int. Cl. ..................................................... B01d
[58] Field of Search ..... 55/42, 46, 49, 52, 190–195, 55/199–203

[56] References Cited
UNITED STATES PATENTS

| 2,774,441 | 12/1956 | Buurman ................................ 55/42 |
| 3,517,487 | 6/1970 | Burnham, Sr. ........................ 55/192 |
| 3,668,838 | 6/1972 | McNeil et al. ...................... 55/193 X |
| 3,540,192 | 11/1970 | Nystrom et al. ....................... 55/192 |
| 3,713,274 | 1/1973 | Sauer ................................. 55/192 X |

*Primary Examiner*—Samih N. Zaharna
*Assistant Examiner*—Richard W. Burks

[57] ABSTRACT

A method and apparatus for removing air from a liquid. The invention provides a heater for heating the liquid so as to reduce the ability of the liquid to retain air, a tank for storing an accumulation of the liquid which has been deaerated, and a means for delivery of the heated liquid into the tank. The delivery means comprises a vertical pipe exposing the hot liquid to an ambiance so that a substantial number of discrete bubbles in the heated liquid will accelerate toward and burst upon contact with the ambiance. The delivery means further includes a generally conically shaped member for cascading the heated liquid in the form of a film so that the film of liquid is exposed to the ambiance to substantially rid the liquid of dissolved air. The invention further provides, in the tank, means for cooling the accumulation of deaerated liquid in such a way that the surface of the liquid in the tank is at a substantially higher temperature than the remainder of the liquid in the tank. The hotter surface liquid functions as a barrier to prevent reaerating of the liquid in the tank.

10 Claims, 1 Drawing Figure

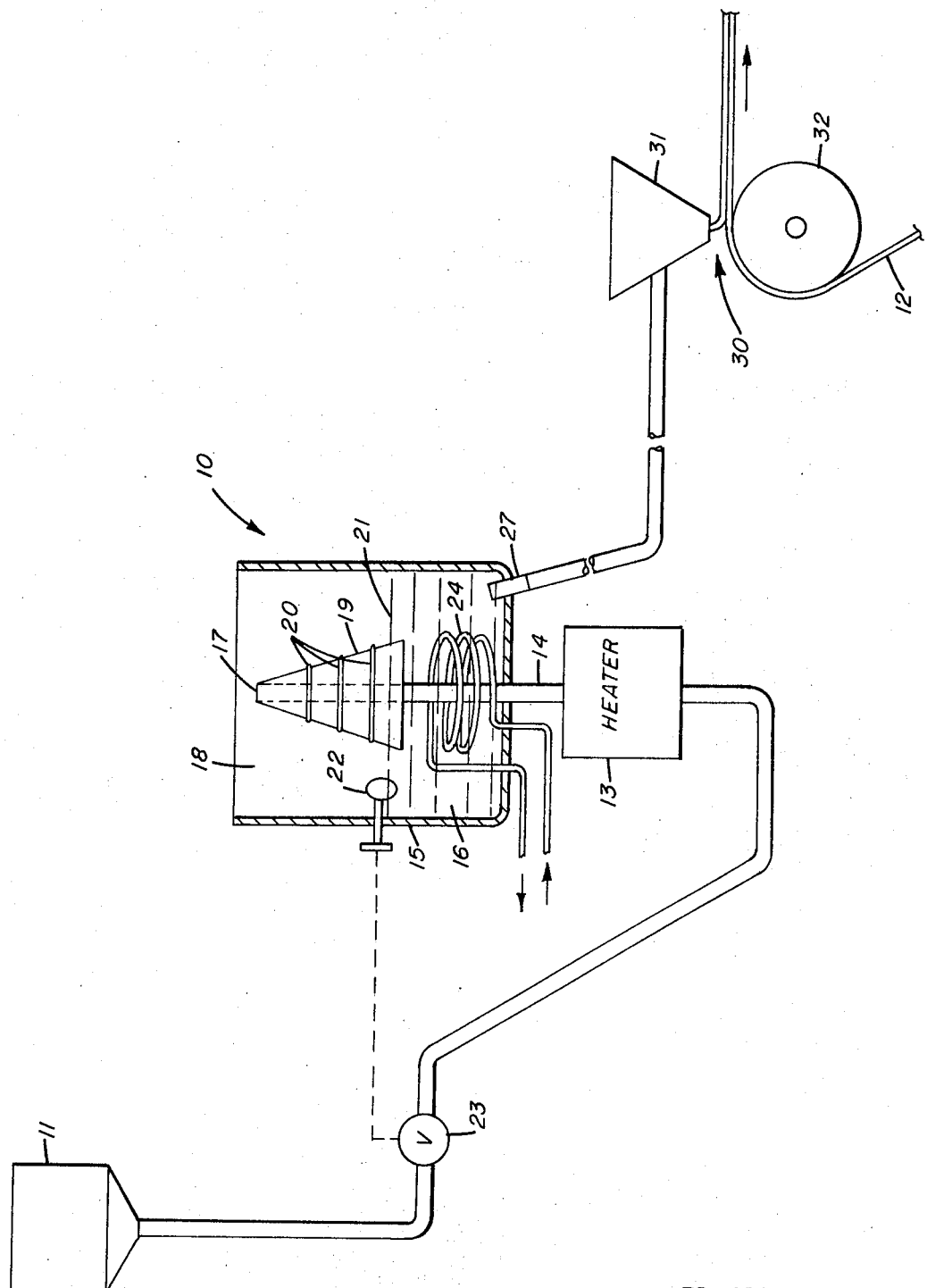

METHOD AND APPARATUS FOR REMOVING AIR FROM A LIQUID

BACKGROUND OF THE INVENTION

1. Field of the Invention

This invention relates to a method and apparatus for removing air from a liquid. In particular, the invention, when employed in its presently preferred environment, will prevent bubbles from appearing in a coating which is laid on a substrate.

2. Description Relative to the Prior Art

In the coating of webs, one problem frequently encountered is the formation of bubbles in the coated layer. In photographic film products, for example, a coating material which contains bubbles may have to be scrapped, as the bubbles seriously affect the quality of the image producible on the film.

Apparently, one reason bubbles are formed in a coating is that the liquid to be coated contains a large amount of air. The air may be present in the liquid in a discrete form as bubbles, or in a non-discrete dissolved form. A need has developed, therefore, for a method and apparatus to remove a substantial amount of the air from a liquid prior to coating the liquid onto the web.

One technique for removing air from a liquid is described in U.S. Pat. No. 1,790,911. In this patent, air is removed from water by heating the water and conveying the water as a film-like stream along a path of downwardly-directed trays. The trays guide the water toward a tank, where it is stored. As the water is guided upon the trays, it is deaerated by exposure to a vacuum. In the tank, two opposed vertical plates and an inlet for high pressure steam are provided to recirculate the water. Upon introduction of the steam into the tank, water is forced by the steam upwardly between the plates and caused to return to the tank via the trays. The forced movement of the water as indicated in the patent contributes to the liberation of air entrained in the water. A problem with using the technique described in U.S. Pat. No. 1,790,911 is that, when it is desired to remove air from a liquid other than water, say latex, the recirculation of the liquid is undesirable. The reason for this is that special pumps may be required, as the latex has a tendency to coagulate and may thus, after a short period of use, clog conventional pumps.

Another technique for removing air from a liquid is described in British Pat. No. 225,639. As described in the British patent, water is deaerated by being subjected to an increase in temperature and a decrease in atmospheric pressure. Specifically, the water is introduced into a chamber by having the water pass through a horizontal perforated plate so that the water falls freely down through the chamber, as a plurality of vertically-directed narrow streams. In the chamber, a conically-shaped member having fins is situated in the path of the falling streams. Through perforations formed in the member, high pressure steam is introduced into the chamber and caused to mix intimately with and heat the water. In addition, the chamber is subjected to a source of vacuum so as to facilitate the deaerating of the liquid. One disadvantage of this latter technique is that in introducing the liquid into the chamber as a vertically-directed narrow stream, air is likely to be absorbed by the liquid unless the environment in the chamber is maintained at a high temperature or at low pressure, i.e., vacuum. Still another disadvantage which is also applicable to the technique described in afore-mentioned U.S. Pat. No. 1,790,911 is that steam is required to be used to heat the liquid that is to be deaerated. While the use of steam may be used to deaerate water, the use of steam to deaerate other liquids, such as latex, is undesirable, as the steam may degrade the latex.

SUMMARY OF THE INVENTION

It is an object of the invention to provide a method and apparatus for substantially removing air from liquids.

The invention proposes that a liquid to be deaerated be heated to a temperature substantially above room temperature, caused to flow as a hot film of liquid in contact with an ambiance so that air will escape from the liquid, and collected in a liquid storage means wherein the deaerated liquid is cooled, the surface of the liquid in the tank, however, being maintained at a temperature substantially higher than the temperature of the cooled liquid, so as to function as a barrier, thereby to substantially preclude air from re-entering the deaerated liquid from the ambiance.

BRIEF DESCRIPTION OF THE DRAWING

The drawing is a representation of an embodiment of the invention.

DESCRIPTION OF THE PREFERRED EMBODIMENTS

With reference to the drawing, there is shown an apparatus 10 including a hopper 11 having a source of liquid, say latex, that is to be deaerated before being coated on a web 12. To remove air from the liquid, the liquid is conveyed to a heat exchanger 13 and heated to a temperature substantially above room temperature, say 175° F. (80° C.) so as to reduce the ability of the liquid to retain air. From the heater 13, the liquid is conveyed upwardly by a vertical conduit or pipe 14, which passes through a tank 15 that is used to store the deaerated liquid 16 and through a hollow, conically-shaped member 20 to be further described below. As the liquid flows upwardly within the pipe 14, bubbles in the liquid tend to accelerate toward the open end 17 of the pipe 14 and burst upon contact with an ambiance 18, which may be a normal atmosphere or a vacuum. After the heated liquid reaches the open pipe end 17, it cascades in film-like form down the member 19, which has the general shape of an upstanding frustum of a cone. The member 19 is provided on its periphery with a plurality of coaxial circular beads or protrusions 20 which serve to agitate the liquid as it flows down the member 19 so as to further reduce the ability of the liquid to retain air. The hot deaerated liquid is then deposited on the surface 21 of the coating supply liquid 16. A conventional float level 22 coupled to a valve 23 may be used to control the level of the liquid in the tank 15. Near the bottom of the tank 15, a coil of piping 24 is provided, and water is circulated therethrough to cool the deaerated liquid 16 to a temperature substantially below 175° F., say 110° F. (43° C.) to thereby provide an unsaturated liquid for coating. The liquid 16 is so cooled that the liquid at the surface 21 is at a temperature substantially higher than that of the deaerated liquid 16, and the hot surface 21 substantially precludes the re-aerating of the deaerated liquid 16.

The deaerated liquid is preferably removed from the bottom of the tank 16 so that bubbles in the liquid that collect and remain on the surface 21 will be left in the tank 15 and not conveyed through a filter 27 to a coating station 30. The coating station 30 may comprise a coating hopper 31 for depositing a coating of the deaerated liquid on the web 12, the web 12 being supported in proximate relationship to the hopper 31 by a coating roller 32.

The invention has been described in detail with particular reference to preferred embodiments thereof, but it will be understood that variations and modifications can be effected within the spirit and scope of the invention.

What is claimed is:

1. A method of removing air from a liquid, the method comprising the steps of:
   a. heating the liquid to a temperature substantially above room temperature;
   b. flowing the heated liquid in film-like form in contact with an ambiance so as to permit air to escape from the liquid;
   c. collecting said deaerated liquid in a container to a predetermined depth with the surface of the contained liquid in contact with an ambiance; and
   d. cooling a lower portion of the contained liquid while maintaining an upper surface portion of the contained liquid at a temperature substantially above that of the cooled liquid, whereby the heated surface portion of the contained liquid functions as a barrier to substantially preclude air from entering the cooled portion of the contained liquid.

2. The invention of claim 1 and including the step of:
   e. conveying the heated liquid vertically toward an ambiance so as to permit bubbles in said liquid to accelerate toward the ambiance and burst upon contact with the ambiance.

3. The invention of claim 2 wherein in step (b), the liquid is agitated as it is flowed in film-like form.

4. An apparatus for removing air from a liquid, the apparatus comprising:
   a. means for heating the liquid to a temperature substantially above room temperature;
   b. means for flowing said heated liquid in film-like form in contact with an ambiance so as to permit air to escape from the liquid;
   c. means located downstream of said flowing means for collecting said liquid and for storing said liquid to a predetermined depth with the surface of said collected liquid in contact with an ambiance; and
   d. means for cooling a lower portion of said liquid in said collecting means while maintaining a portion of the liquid at the surface thereof at a temperature substantially above that of the cooled portion of the liquid, whereby the heated portion at the surface of the collected liquid functions as a barrier to substantially preclude air from entering the cooled portion of the collected liquid.

5. The invention of claim 4 and including:
   e. means for conveying said heated liquid from said heating means to said flowing means, said conveying means comprising a generally-vertically-directed pipe for conveying the heated liquid vertically toward an ambiance so as to permit bubbles in said liquid to accelerate toward the ambiance and burst upon contact with the ambiance.

6. The invention of claim 4 wherein said flowing means includes means for agitating said liquid as it is flowed in film-like form.

7. An apparatus for removing air from a liquid, the apparatus comprising:
   means for heating said liquid to reduce the ability of the liquid to retain air;
   means for storing an accumulation of deaerated liquid to a predetermined depth with the surface of the stored liquid in contact with an ambiance, said liquid storing means including an outlet below the liquid surface level for permitting the stored liquid to be withdrawn from the storing means;
   delivery means for introducing the heated liquid into the storing means, the delivery means including:
   a. a generally-vertically upstanding conduit which receives the heated liquid at a lower portion thereof and delivers the heated liquid to a higher portion thereof, the higher portion of the conduit including an opening to expose the heated liquid to the ambiance, and
   b. means for receiving the heated liquid from the higher portion of the conduit and for cascading the liquid in the form of a film toward the deaerated liquid in the storing means; and
   means for cooling a lower portion of the liquid in the storing means so that the temperature of the liquid at the surface is substantially higher than the temperature of the liquid proximate the outlet, whereby the warmer liquid at the surface functions as a barrier to substantially isolate air in the ambiance from the relatively cooler liquid adjacent the outlet.

8. The invention according to claim 7 wherein said cascading means has the general shape of an upstanding frustum of cone and has a hollow extending therethrough.

9. The invention according to claim 8 wherein said pipe extends through said storing means and through the hollow of said cascading means.

10. The invention according to claim 9 wherein said cascading means includes protuberances formed on circles on said cascading means for agitating the liquid as it is cascaded down said cascading means.

* * * * *